3,455,994
PROCESS FOR THE PREPARATION OF CARBONYL COMPOUNDS CONTAINING A HINDERED PHENOL GROUP
Martin Knell, Ossining, N.Y., assignor to Geigy Chemical Corporation, Ardsley, N.Y., a corporation of Delaware
No Drawing. Continuation-in-part of application Ser. No. 276,194, Apr. 29, 1963. This application Sept. 27, 1966, Ser. No. 582,244
Int. Cl. C07c *69/76, 69/78*
U.S. Cl. 260—473                14 Claims

ABSTRACT OF THE DISCLOSURE

Process for providing esters of 3,5-dialkyl-4-hydroxyphenol acetic acid and α-alkyl derivatives thereof which are useful to stabilize compounds against deterioration caused by heat, light, oxidation, and the like by reacting together a 2,6-dialkyl phenol and an α-halo ester compound in the presence of a strong base at a temperature of about 40° to about 200° C.

Ethyl α-(4-hydroxy-3,5-di-tert.-butylphenyl)isobutyrate is prepared by the reaction of 2,6-di-tert.-butylphenol with ethyl α-bromo-α-methyl propionate in the presence of potassium tertiary butoxide by refluxing for one hour.

---

This application is a continuation-in-part of copending application Ser. No. 276,194, filed Apr. 29, 1963, now abandoned.

The invention relates to a method for the preparation of organic compounds useful as stabilizers. More particularly it concerns a means to prepare esters of 3,5-dialkyl-4-hydroxyphenylacetic acid and α-alkyl derivatives thereof, small amounts of which protect organic material from deterioration caused by heat, light, oxygen, ozone, and other physical or chemical forces tending to cause degradation, embrittlement, gum or sludge formation, discoloration and other undesirable effects.

The processes contemplated by this invention provide esters of 3,5-dialkyl - 4 - hydroxyphenylacetic acid and derivatives of Formula I:

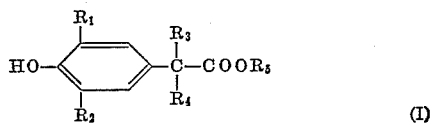

(I)

wherein $R_1$ is a secondary or tertiary alkyl group, especially secondary or tertiary alkyl of 4 to 10 carbon atoms; $R_2$ is an alkyl group, preferably a tertiary alkyl group of 4 to 10 carbon atoms; $R_3$ and $R_4$ are each independently hydrogen, or alkyl, particularly lower alkyl, such as methyl or hexyl; and $R_5$ is an alkyl group, especially alkyl having from 1 to 24 carbon atoms.

In the present state of the art, processes are known in which phenols can be alkylated by treating them with alkyl halides under acidic, neutral or alkaline reaction conditions. And since 2,6-di-alkylphenols, especially 2,6-di-tert.-butylphenol, are items of commerce, it would be desirable to use them as starting materials to prepare compounds of Formula I by alkylating the said phenols with suitably substituted halo-esters. Those skilled in the art are not unaware, for example, of the teachings of Stevens et al., in U.S. 2,202,877 wherein it was shown some twenty-three years ago that 2,4-di-tert.-butylphenol can be alkylated in the 6-position with a halo-alkane, tert.-butyl chloride, to provide 2,4,6-tri-tert.-butylphenol. However, they also know that, although tert.-butyl chloride and phenol react quantitatively to provide 4-tert.-butylphenol even in the absence of a catalyst (Hart and Simmons, J. Am. Chem. So., 71, 346 (1949)), under identical conditions there is no alkylation at all when 2,6-di-tert.-butylphenol is treated with tert.-butyl chloride in an attempt to obtain the 2,4,6-tri-tert.-butylphenol of Stevens et al. (Hart and Cassis, J. Am. Chem. Soc., 73, 3179 (1951)). Taken together these teachings show that merely because a position is open does not mean that the desired substituted product will be obtained. Furthermore, it is not possible to predict whether any particular substituted phenol will be substituted in any desired fashion. In view of this statement of the art, therefore, it is surprising and unexpected to find that compounds of Formual I indeed can be prepared by alkylating in the 4-position a 2,6-dialkylphenol with a halo-ester and thus the present invention provides a novel, useful and inventive means to obtain valuable stabilizers, in good yield, from readily available starting materials.

The instant invention contemplates, in essence, an alkylation process which comprises reacting a 2,6-dialkylphenol of Formula II:

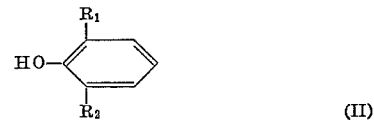

(II)

wherein $R_1$ and $R_2$ are defined as hereinabove, with an α-halo-ester of Formula III:

(III)

wherein $R_3$, $R_4$ and $R_5$ are as defined above and X is halogen of atomic number from 17 to 53, in the presence of a strong base, preferably in a nonaqueous, nonreactive polar solvent such as an alcohol, especially a tertiary alkanol such as tertiary butanol. Another useful class of solvent comprises ethers, such as, for example, triethylene glycol dimethyl ether.

The strong bases contemplated by this invention are alkali metal alkoxides, especially alkali metal tertiary alkoxides, such as potassium t-butoxide. Other alkali metal alkoxides are also useful, for example, sodium methoxide. Other strong bases also are useful, such as quaternary ammonium bases, for example, benzyltrimethylammonium methoxide. Also contemplated as a strong base is sodamide.

Ordinarily the strong base is used in stoichiometric quantities, or equimolar amounts, based upon the moles of phenol of Formula II.

Generally, reactants of the Formulae II and III are employed in equimolar amounts, although an excess of either reactant can be used.

The compounds of Formulae II and III are prepared in known ways and many of them are commercially available, at least in research quantities.

The temperature at which the reaction is carried out may be varied broadly. For example, it may be carried out at temperatures from about 40° C. to about 200° C. The preferred range, however, for best rates and yields is from about 80° C. to about 120° C.

The starting materials of Formula II are prepared by alkylation of phenols. Besides 2,6-di-tert.-butylphenol, other starting materials useful in the instant process are: 2-tert.-butyl-6-methylphenol, 2,6 - bis(1,1,3,3-tetramethylbutyl)phenol, 2-sec.-butyl-6-t-butylphenol, 2,6-bis-(1,1-dimethyl-n-propyl)phenol, 2,6-bis(1-methyl-n-nonyl)phenol, 2-(1,1,3,3-tetramethyl-n-butyl) - 6 - methylphenol, and the like.

Compounds of Formula III are α-halo-carboxylic acid esters which are prepared by esterification of the corresponding α-haloacetic acid with an appropriate alcohol.

Illustrative of such esters are: ethyl α-bromoacetate, methyl α-chloroacetate, n-propyl α-iodoacetate, n-butyl α-bromoacetate, n-pentyl α-chloropropionate, n-hexyl α-bromobutyrate, n-heptyl α-chloropentanoate, n-octyl α-bromo hexanoate, n-nonyl α-chloroheptanoate, n-dodecyl α-bromooctanoate, n-octadecyl α-chloro-α-methylpropionate, n-docosyl α-bromo-α-ethylbutyrate, n-tetracosyl α-chloro-α-propylpentanoate, n-decyl α-bromo-α-butylhexanoate, ethyl α-chloro-α-pentylhexanoate, isopropyl α-bromo-α-methylpropionate, ethyl α-chloro-α-methylpropionate, and the like.

Illustrative of the unstable organic materials protected by incorporation of the esters of 3,5-dialkyl-4-hydroxyphenylacetic acid and derivatives of Formula I herein are lubricating oil and fuel oils, waxes, soaps, greases, gasoline, natural and synthetic rubbers, resins and plastics and especially polyolefins, such as polypropylene, and the like.

In the examples which follow, parts are by weight, unless otherwise indicated. The relationship between parts by weight and parts by volume is as that between grams and cubic centimeters. Temperatures are in degrees centigrade. The following examples are illustrative of the invention, but are not meant to limit the concept or scope thereof in any way.

EXAMPLE I

Ethyl α-(4-hydroxy-3,5-di-tert.-butylphenyl)isobutyrate

To 200 parts by volume of dry tertiary butyl alcohol contained in a suitable flask (fitted with mechanical stirrer, inert gas inlet, thermometer, condenser and dropping funnel) is added 22.4 parts of potassium tertiary butoxide, 41.2 parts of 2,6-di-tert.-butylphenol and 50 parts by volume of triethylene glycol dimethyl ether. The dark green solution is stirred and a solution of an equimolar portion of ethyl α-bromo-α-methylpropionate in 50 parts of tertiary butyl alcohol is added dropwise over 20–60 minutes. After the addition, the reaction is refluxed for 1 hour at which time the solution is neutral. The reaction mixture is poured into water and extracted with ether. The ether solution is washed with water, dried and the ether removed by distillation and the product isolated by vacuum distillation, boiling point 106°/0.010 mm. Hg.

EXAMPLE II

Ethyl α-(4-hydroxy-3,5-di-tert.-butylphenyl)propionate

According to the method in Example I hereinabove, ethyl α-(4-hydroxy-3,5-di-tert.-butylphenyl)propionate is prepared, except that ethyl α-bromopropionate is used in place of ethyl α-bromo-α-methylpropionate; the desired product melts at 54–56°.

Other compounds are prepared in similar fashion. For example, methyl α-(4-hydroxy-3,5-di-tert.-butyl)isobutyrate is prepared from methyl α-bromo-α-methylpropionate. Dodecyl α - (4-hydroxy-3,5-di-tert.-butylphenyl)isobutyrate is prepared from dodecyl α-(4-hydroxy-3,5-di-tert.-butylphenyl)isobutyrate. Octadecyl α-(4-hydroxy-3,5-di-tert.-butylphenyl)propionate is prepared from octadecyl α-bromopropionate. Tetracosyl α-(4-hydroxy-3,5-di-tert.-butylphenyl)propionate is prepared from tetracosyl α-bromopropionate. Octadecyl α-(4-hydroxy-3,5-di-tert.-butylphenyl)isobutyrate is prepared from octadecyl α-bromo-α-methylpropionate. Octadecyl 4-hydroxy - 3,5 - di - tert.-butylphenylacetate, M.P. 33–35° C., is prepared from octadecyl bromoacetate.

Alternatively, as illustrated in the following examples, the higher alkyl esters, such as the octadecyl and the tetracosyl esters, are conveniently prepared by transesterification reactions, starting with a lower alkyl ester of the hindered phenol of Formula I, such as a methyl or ethyl ester, and reacting them with the appropriate higher alcohol, for example, n-octadecanol or tetracosanol.

Examples III and IV are illustrations of useful transesterification reactions.

EXAMPLE III

Octadecyl α-(4-hydroxy-3,5-di-tert.-butylphenyl) isobutyrate

A solution of 16 parts of ethyl α-(4-hydroxy-3,5-di-tert.-butylphenyl)isobutyrate, 13.5 parts of n-octadecyl alcohol and 0.5 part of sodium methylate in 150 parts by volume of o-dichlorobenzene is distilled under a nitrogen atmosphere until the vapor temperature reaches and remains at the boiling point of the dichlorobenzene. The solution is refluxed for 6 hours, cooled, neutralized with a few drops of acetic acid and the solvent removed under vacuum on a water bath. The product after two recrystallizations from methanol melts at 46–48°. The yield is 57%.

EXAMPLE IV

Octadecyl α-(4-hydroxy-3,5-di-tert.-butylphenyl) propionate

A solution of 20 parts of ethyl α-(4-hydroxy-3,5-di-tert.-butylphenyl)propionate, 17.65 parts of n-octadecyl alcohol and 0.5 part of sodium methylate in 150 parts by volume of dry toluene is distilled under a nitrogen atmosphere until the vapor temperature reaches and remains at the boiling point of toluene. The solution is then cooled, neutralized with acetic acid and the solvent removed under vacuum on a water bath. The product after two recrystallizations from methanol melts at 46–47°. The yield is 53%.

EXAMPLE V

Ethyl α-(4-hydroxy-3,5-di-tert.-butylphenyl)octanoate

The general method illustrated in Example I is repeated except that ethyl α-bromooctanoate is used in place of ethyl α-bromo-α-methylpropionate in proportionate molar quantity. There is obtained ethyl α-(4-hydroxy-3,5-di-tert.-butylphenyl)octanoate.

EXAMPLE VI

Ethyl α-(4-hydroxy-3,5-di-tert.-butylphenyl)-α-ethylhexanoate

The general method illustrated in Example I is repeated except that ethyl α-bromo-α-ethylhexanoate is employed in place of ethyl α-bromo-α-methylpropionate in proportionate molar amount. There is obtained ethyl α-(4-hydroxy-3,5-di-tert.-butylphenyl)-α-ethylhexanoate.

What is claimed is:

1. A process for the preparation of compounds of the formula

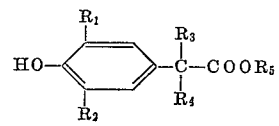

wherein
$R_1$ is selected from secondary alkyl or tertiary alkyl groups having from 4 to 10 carbon atoms;
$R_2$ is a tertiary alkyl group having 4 to 10 carbon atoms;
$R_3$ and $R_4$ are each independently selected from hydrogen or alkyl; and
$R_5$ is alkyl,
said process comprising reacting together a 2,6-dialkyl phenol of the formula

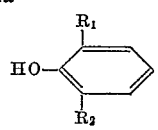

with an α-halo-ester of the formula

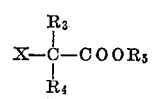

wherein each of the above formulae $R_1$, $R_2$, $R_3$, $R_4$ and $R_5$ are as defined above, and X is halogen of atomic number of from 17 to 53, said process being carried out in the presence of a strong base selected from alkali metal alkoxides, sodamide or quaternary ammonium bases and at a temperature of from about 40° C. to about 200° C.

2. The process of claim 1, wherein the strong base is an alkali metal alkoxide.

3. The process of claim 1, wherein the halogen is selected from chlorine or bromine.

4. The process of claim 3, wherein the strong base is an alkali metal alkoxide.

5. The process of claim 1, wherein the phenol reactant, the α-halo-ester reactant, and the strong base are each employed in substantially equimolar quantities.

6. The process of claim 4, wherein $R_1$ and $R_2$ are each tertiary alkyl.

7. The process of claim 4, wherein $R_1$ and $R_2$ are each tertiary butyl.

8. The process of claim 4, wherein $R_5$ is an alkyl group having from 1 to 24 carbon atoms.

9. The process of claim 4, wherein:
$R_1$ and $R_2$ are each tertiary alkyl of from 4 to 10 carbon atoms;
$R_3$ and $R_4$ are each independently selected from hydrogen or alkyl; and
$R_5$ is alkyl of from 1 to 24 carbon atoms.

10. The process of claim 4, wherein:
$R_1$ and $R_2$ are each tertiary butyl;
$R_3$ and $R_4$ are each methyl;
$R_5$ is ethyl;
and the strong base is potassium tertiary butoxide.

11. The process of claim 4, wherein:
$R_1$ and $R_2$ are each tertiary butyl;
$R_3$ is hydrogen;
$R_4$ is methyl;
$R_5$ is ethyl;
and the strong base is potassium tertiary butoxide.

12. The process of claim 4, wherein:
$R_1$ and $R_2$ are each tertiary butyl;
$R_3$ is hydrogen;
$R_4$ is methyl;
$R_5$ is octadecyl;
and the strong base is potassium tertiary butoxide.

13. The process of claim 4 wherein:
$R_1$ and $R_2$ are each tertiary butyl;
$R_3$ and $R_4$ are each methyl;
$R_5$ is octadecyl;
and the strong base is potassium tertiary butoxide.

14. The process of claim 4, wherein:
$R_1$ and $R_2$ are each tertiary butyl;
$R_3$ and $R_4$ are each hydrogen;
$R_5$ is octadecyl;
and the strong base is potassium tertiary butoxide.

References Cited

UNITED STATES PATENTS 2,202,877  4/1937  Stevens et al. _____ 260—473
3,330,859  6/1967  Dexter et al. _____ 260—473

LORRAINE A. WEINBERGER, Primary Examiner

D. STENZEL, Assistant Examiner

U.S. Cl. X.R.

260—410.9